United States Patent Office 3,188,194
Patented June 8, 1965

3,188,194
HERBICIDAL MIXTURE AND PROCESS FOR DESTROYING PLANT LIFE THEREWITH
Francois d'Ogny, Paris, France, assignor to Pechiney-Cie de Produits Chimiques et Electrometallurgiques, Paris, France
No Drawing. Filed Nov. 15, 1960, Ser. No. 69,395
Claims priority, application France, Nov. 21, 1959, 810,868, Patent 1,249,883
3 Claims. (Cl. 71—2.5)

This invention relates to means and materials for destroying plant life of a selected nature, and relates more particularly to the activation of known herbicidal agents to accelerate or catalyze the actions thereof.

To the present, known herbicidal agents, including the so-called total herbicides, require considerable time before their action has been completely expended to determine the ultimate effects thereof. During this prolonged reaction, the process is subject to a number of drawbacks, including the possible dilution or elimination of the herbicidal agents by rain or other atmospheric effects beyond the user's control. The long-time span before the effect can be ascertained also reacts negatively on the user from a psychological standpoint.

As a result, it is an object of this invention to provide a means and method for activation of herbicidal agents to accelerate the action thereof, whereby the plant destruction sought to be secured is obtained in a considerably shorter time, such as within several days and preferably within three to five days, rather than the several weeks heretofore required.

Another object is to provide a means and method for use in combination with herbicidal agents whereby such agents can be made effective for use in the treatment of plants otherwise normally insensitive to the particular herbicidal agent.

In accordance with the practice of this invention, the desired activation of the herbicide is achieved by the combination of the herbicide with an oxygenated compound of phorphorus having the formula

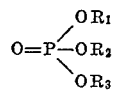

wherein $R_1$ is selected from the group consisting of hydrogen, an alkyl, aryl, aryl-alkyl, cycloaliphatic or heterocyclic groups, and $R_2$ and $R_3$ are selected from the group consisting of alkyl, aryl, aryl-alkyl, cycloaliphatic or heterocyclic groups. In other words, at least two of the groups attached to the oxygens connected by a single bond to the phosphorus group is an organic group, while the other is either an organic group or hydrogen.

Representative of the compounds which may be employed in combination with the herbicides, in accordance with the practice of this invention, are tributyl, tricresyl, tri-isobutyl, and the like phosphates. Representative of the herbicidal agents which may be employed in combination with the oxygenated compound of phosphorus are parachlorophenyl-dimehtyl urea, amino-triazol, 2-chloro-4,6-bis(ethylamino)-S-triazine, the solium salt of alpha-alpha-dichloropropionic acid, etc. The foregoing are given by way of illustration and not by way of limitation of the oxygenated compounds of phosphorus and the herbicides, it being understood that other oxygenated compounds of phosphorus represented by the above formulation can be combined with other known herbicides in a synergistic reaction to catalyze the herbicide in a manner whereby the plant-destroying effect of the herbicide is greatly accelerated and whereby the plant-destroying effect of the herbicide is expanded to provide a more or less herbicidal action on plants not normally sensitive to such agent.

The oxygenated compound of phosphorus is effective to catalyze the reaction of the herbicide when combined in any amounts. However, best results are secured when the amount of the oxygenated compound of phosphorus is present in the combination with the herbicide in at least stoichiometric proportions.

In practice at least 5 kg. of oxygenated compound of phosphorus is used per hectare and, preferably about 10 to 40 kg. per hectare; the quantity of herbicidal agent then used depends on the said compound one.

The oxygenated compound of phosphorus and the herbicidal agent may be brought together in any conventional manner. For example, in the event that the herbicide is soluble in the phosphorus compound, the former may be dissolved to provide a solution in the latter. In the event that the one is not soluble in the other, a third component in which both are soluble may be employed, either as a carrier or to bring the compounds together. It is preferred to make use of a system which is capable of dispersion or emulsification in aqueous medium. The thus obtained solution, dispersion, or suspension can be applied directly onto the plant to be killed, as by means of an aerosol spray or the like. The phosphorus compound may also be added, after it has eventually been made emulsifiable, to an aqueous slurry which contains one or more herbicidal agents, the latter of which may either be dissolved or else present in the form of an emulsion or suspension in the slurry.

Further, this invention has for another of its objects a new composition of matter comprising a herbicide containing at least one oxygenated compound of phosphorus, as previously described.

The following examples are given by way of illustration but not by way of limitation of the practice of this invention.

EXAMPLE 1

In a hothouse maintained at about 21° C., plantlets of mustard (M), corn (B), and nasturtium (C) were treated with tributyl phosphate and with tri-isobutyl phosphate as one control, based upon the use of oxygenated compounds of phosphorus alone. Other plants were treated with parachlorophenyl-dimethyl urea and aminotriazol, as another control, based upon use of herbicide alone. Still further plantlets were treated with a mixture of the above oxygenated compounds of phosphorus and herbicides in accordance with the practice of this invention. Evaluation of the results was made after three days, and again after thirty days, and the determinations are set forth in the following table, in which the numeral 0 indicates no mortality, and the numeral 100 corresponds to total mortality of the treated plant:

Table I

| Used products | Used quantities, kg./hectare | Treated plants ||||||
|---|---|---|---|---|---|---|---|
| | | Results within 3 days ||| Results within 30 days |||
| | | M | B | C | M | B | C |
| Parachlorophenyldimethyl urea | 2 | 0 | 0 | 0 | 100 | 100 | 95 |
| Aminotriazol | 2 | | 0 | 0 | | 95 | 80 |
| Tri-isobutyl phosphate +Emulsifier | 10 2 | 30 | 15 | 10 | 70 | 30 | 30 |
| Tri-butyl phsophate +Emulsifier | 10 1.5 | | 30 | 50 | | 50 | 70 |
| Parachlorophenyl-dimethyl urea +Tri-isobutyl phosphate +Emulsifier | 2 10 2 | 100 | 80 | 75 | 100 | 100 | 95 |
| Parachlorophenyl-dimethyl urea +Tri-butyl phosphate +Emulsifier | 2 10 1.5 | 100 | 80 | 80 | 100 | 100 | 98 |
| Aminotriazol +Tri-butyl | 2 10 | | 80 | 80 | | 100 | 95 |

The emulsifying agent for the phosphates was a condensation product of oleic acid and ethylene oxide.

EXAMPLE 2

Tests identical to those described in Example 1 were carried out in the presence of the following herbicidal agents. (1) 2-chloro-4,6-bis(ethylamino)S-triazine, (2) the sodium salt of alpha-alpha-dichloropropionic acid, (3) aminotriazol, and (4) sodium chlorate.

Obtained results are brought together in Table II.

Table II

| Used products | Used quantities, kg./hectare | Treated plants |||
|---|---|---|---|---|
| | | Results within 5 days |||
| | | M | B | C |
| 2-chloro-4,6-bis(ethylamino)-S-triazine | 5 | 0 | 0 | 0 |
| Sodium salt of alpha-alpha-dichloro-propionic acid | 5 | 0 | 0 | 0 |
| Aminotriazol | 1 | 5 | 0 | 0 |
| Sodium chlorate | 20 | *l.b. | l.b. | l.b. |
| Tri-butyl phosphate +Emulsifier | 10 1.5 | 100 | 40 | 60 |
| 2-chloro-4,6-bis(ethylamino)-S-triazine +Tributyl phosphate +Emulsifier | 2.5 10 1.5 | 100 | 80 | 85 |
| Sodium salt of alpha-alpha-dichloro-propionic acid +Tributyl phosphate +Emulsifier | 5 10 1.5 | 100 | 75 | 70 |
| Aminotriazol +Tributyl phosphate +Emulsifier | 1 10 1.5 | 100 | 75 | 85 |
| Sodium chlorate +Tributyl phosphate +Emulsifier | 20 10 1.5 | 100 | 75 | 80 |

* "l.b." means "little burnings."

It should be noted, particularly in the case of the sodium salt of alpha-alpha-dichloropropionic acid, that this herbicide agent, which is used as a selective antigraminacese agent, becomes effective when combined with an oxygenated compound of phosphorus, as a herbicide to destroy such plants as mustard and nasturtium, plants which were heretofore relatively unaffected by the particular compound when used alone.

EXAMPLE 3

Various plants were treated in the field with tributyl or tricresyl phosphate as representative of the oxygenated compounds of phosphorus and with parachlorophenyl-dimethyl urea and sodium chlorate, as representative of herbicidal agents and with various combinations of the oxygenated compounds of phosphorus and herbicidal agents. The results are set forth in the following Table III:

Table III

| Used products | Used quantities, kg./ha. | Results within 5 days || Results within 1 month ||
|---|---|---|---|---|---|
| | | Treated plants | Rate of mortality | Treated plants | Rate of mortality |
| Tributyl phosphate +Emulsifier (check) | 20 3 | (1) graminaceae horsetails plantains mints goose-grass carrots erigerons | 0 0 10 0 0 0 10 | (1) graminaceae horsetails plantains mints goose-grass carrots erigerons potentillas | 0. 0. 0. 0. 0. 0. 10. sprouts. |

See footnotes at end of table.

*Table III—Continued*

| Used products | Used quantities, kg./ha. | Results within 5 days | | Results within 1 month | |
|---|---|---|---|---|---|
| | | Treated plants | Rate of mortality | Treated plants | Rate of mortality |
| Tributyl phosphate<br>+Emulsifier<br>(check) | 20<br>3 | (2)<br>graminaceae<br>plantains<br>mints<br>goose-grass<br>potentillas<br>sorrels | 0<br>0<br>0<br>sl. att.<br>0<br>0 | (2)<br>graminaceae<br>horsetail<br>plantains<br>mints<br>potentillas | 0.<br>0.<br>respr.<br>0.<br>respr. |
| Tributyl phosphate<br>+Emulsifier<br>(check) | 10<br>3 | (1)<br>graminaceae<br>horsetails<br>thistles<br>buttercups<br>goose-grass<br>mints<br>coltsfoot | 0<br>0<br>20<br>0<br>0<br>0<br>0 | (1)<br>graminaceae<br>horsetails<br>thistles<br>buttercups<br>mints<br>coltsfoot<br>potentillas<br>plantains<br>sorrels | 10.<br>0.<br>50.<br>very sl. att.+respr.<br>0.<br>0.<br>sl. att.<br>0.<br>sprouts. |
| | | (2)<br>graminaceae<br>horsetails<br>buttercups<br>goose-grass<br>mints<br>coltsfoot<br>potentillas<br>plantains<br>ox eye daisies | 0<br>0<br>0<br>0<br>0<br>0<br>0<br>0<br>0 | (2)<br>graminaceae<br>buttercups<br>goose-grass<br>mints<br>coltsfoot<br>plantains<br>ox eye daisies<br>sorrels | 0.<br>50 respr.<br>100.<br>sl. att.<br>40.<br>0.<br>0.<br>sprouts. |
| Parachlorophenyl-dimethyl urea.<br>(check) | 2 | (1)<br>graminaceae<br>horsetails<br>cow-parsnips<br>thistles<br>mints<br>artemises | 0<br>0<br>0<br>0<br>0<br>0 | (1)<br>graminaceae<br>horsetails<br>cow-parsnips<br>thistles<br>mints<br>artemises<br>buttercups<br>potentillas | 20+respr.<br>70.<br>10.<br>60.<br>10.<br>20.<br>sprouts.<br>Do. |
| | | (2)<br>graminaceae<br>horsetails<br>mints<br>artemises | 0<br>0<br>0<br>0 | (2)<br>graminaceae<br>horsetails<br>mints | 25+respr.<br>75.<br>10. |
| Sodium chlorate<br>(check) | 40 | (1)<br>graminaceae<br>goose-grass<br>mints<br>sorrels<br>dandelions<br>cow-parsnips<br>horsetails | 50<br>20<br><br>40<br>10<br>20<br>10 | (1)<br>graminaceae<br>goose-grass<br>mints<br>sorrels<br>dandelions<br>cow-parsnips<br>horsetails<br>buttercups | 30 (sl. respr.)<br>100.<br>100.<br>50.<br>respr.<br>20+sl. respr.<br>10.<br>sprouts. |
| | | (2)<br>graminaceae<br>mints<br>plantains<br>potentillas | 50<br>20<br>50<br>60 | (2)<br>graminaceae<br>mints<br>plantains<br>potentillas<br>carrots<br>buttercups | 20 (respr.)<br>30.<br>50+sl. respr.<br>50+sl. respr.<br>Sprouts.<br>Do. |
| Parachlorophenyldimethyl urea.<br>+Tributyl phosphate<br>+Emulsifier | 2<br>20<br>3 | (1)<br>graminaceae<br>mints<br>plantains<br>buttercups<br>sorrels<br>goose-grass<br>thistles<br>potentillas | 95<br>100<br>100<br>100<br>90<br>100<br>100<br>100 | (1)<br>graminaceae<br>mints<br>plantains<br>buttercups<br>sorrels<br>goose-grass<br>thistles<br>potentillas | 80 respr.<br>100.<br>100.<br>100.<br>90 (sl. respr.)<br>100.<br>100.<br>100. |
| | | (2)<br>graminaceae<br>mints<br>plantains<br>thistles<br>potentillas<br>horsetails | 95<br>80<br>100<br>100<br>100<br>50 | (2)<br>graminaceae<br>mints<br>plantains<br>buttercups<br>thistles<br>potentillas | 80.<br>90.<br>100.<br>sl. respr.<br>100.<br>90 (respr.) |
| Sodium chlorate<br>+Tributyl phosphate<br>+Emulsifier | 40<br>20<br>3 | (1)<br>graminaceae<br>potentillas<br>mints<br>thistles<br>horsetails | 50<br>100<br>90<br>100<br>80 | (1)<br>graminaceae<br>potentillas<br>mints<br>thistles<br>horsetails<br>buttercups | 60.<br>100.<br>100.<br>100.<br>100.<br>sl. respr. |
| | | (2)<br>graminaceae<br>potentillas<br>mints<br>thistles<br>horsetails | 50<br>100<br>90<br>90<br>90 | (2)<br>graminaceae<br>potentillas<br>mints<br>thistles<br>horsetails<br>buttercups | 65.<br>100.<br>100.<br>100.<br>100.<br>sl. respr. |

See footnotes at end of table.

*Table III—Continued*

| Used products | Used quantities, kg./ha. | Results within 5 days | | Results within 1 month | |
|---|---|---|---|---|---|
| | | Treated plants | Rate of mortality | Treated plants | Rate of mortality |
| Parachlorophenyldimethyl urea. +Tricresyl phosphate +Emulsifier | 2<br>20<br>3 | (1)<br>graminaceae<br>horsetails<br>thistles<br>sorrels<br>buttercups<br>oaks | 80<br>30<br>90<br>80<br>90<br>100 | (1)<br>graminaceae<br>horsetails<br>thistles<br>sorrels<br>buttercups<br>oaks | 60.<br>90.<br>100.<br>50.<br>90+sl. respr.<br>100. |
| | | (2)<br>graminaceae<br>horsetails<br>thistles<br><br>sorrels<br>mints | 80<br>30<br>90<br><br>70<br>75 | (2)<br>graminaceae<br>horsetails<br>thistles<br><br>sorrels<br>buttercups<br>mints | 50.<br>50.<br>100+1 sl. respr.<br>60.<br>sprouts<br>80. |

In the table, the meaning of the various abbreviations is the following:
ha.—(hectare) is 10,000 square meters.
sl.—slight.
att.—attack.
respr.—resprout.

It will be apparent from the results obtained in Example 1, Table I, that no noticeable effect is secured from the herbicides when used alone after three days of application, and that negligible results are secured by the use of oxygenated compound of phosphorus separate and apart from the herbicide. Yet, when both are combined in a single composition and applied onto the plantlets, mortality after three days is almost as great as the mortality secured after thirty days by the herbicide without the phosphate.

The results secured in Example 3 with the various field plants equally demonstrates the lack of effectiveness of the separate components when used alone after five to eight days of application, and the marked increase to almost complete mortality in the same length of time when the same herbicide is applied in combination with the same oxygenated compounds of phosphorus in accordance with the practice of this invention. It should be also noted that the effectiveness of the herbicide is spread to many more plants which are otherwise not effectively treated by the herbicide when used alone.

It will be understood that various changes may be made in the method of formulations and applications without departing from the spirit of the invention, especially as defined in the following claims.

I claim:

1. A herbicidal composition comprising the combination in admixture of a herbicide selected from the group consisting of parachlorophenyl dimethyl urea, aminotriazol, 2-chloro-4,6-bis(ethyl amino)S-triazine and the sodium salt of alpha-alpha-dichloropropionic acid and an oxygenated compound of phosphorus selected from the group consisting of tributyl phosphate, triisobutyl phosphate and tricresyl phosphate in which the oxygenated compound of phosphorus is present in the combination in at least stoichiometric proportion in the herbicide and in which the two components are present in herbicidal effective amounts.

2. A process for destroying plant life comprising treating the plant life with a composition comprising the combination in admixture of a herbicide selected from the group consisting of parachlorophenyl dimethyl urea, aminotriazol, 2-chloro-4,6-bis(ethyl amino)S-triazine and the sodium salt of alpha-alpha-dichloropropionic acid and an oxygenated compound of phosphorus selected from the group consisting of tributyl phosphate, triisobutyl phosphate and tricresyl phosphate in which the oxygenated compound of phosphorus is present in the combination with the herbicide in at least stoichiometric proportions and in which the two components are present in herbicidal effective amounts, and in which the combination is applied in an amount of at least 5 kg. of the oxygenated compound per hectare of plant life.

3. The process as claimed in claim 2 in which the composition is applied in an amount of 10 to 40 kg. per hectare of plant life.

References Cited in the file of this patent

UNITED STATES PATENTS 2,580,653   Bridgeman _____ Jan. 1, 1952

OTHER REFERENCES

Thompson et al. in "Botanical Gazette," vol. 107, 1946, pages 475 to 507.

Metcalf: "Advances in Pest Control Research," vol. 1, 1957, pages 39 to 79.

Ennis et al. in "Science," vol. 103, No. 2677, page 476, April 19, 1946.

Hitchcock et al. in "Contrib. Boyce Thompson Institute," vol. 15, No. 4, pages 173 to 193, 1948.

Gast et al. in "Agricultural Chemicals," vol. 11, No. 4, April 1956, pages 42 to 45, 136 and 137.

UNITED STATES PATENT OFFICE
CERTIFICATE OF CORRECTION

Patent No. 3,188,194            June 8, 1965

Francois d'Ogny

It is hereby certified that error appears in the above numbered patent requiring correction and that the said Letters Patent should read as corrected below.

Columns 5 and 6, Table III-Continued, in the heading to columns 3 and 4, for "Results within 5 days" read -- Results within 8 days --.

Signed and sealed this 26th day of October 1965.

(SEAL)
Attest:

ERNEST W. SWIDER            EDWARD J. BRENNER
Attesting Officer            Commissioner of Patents